(12) United States Patent
English et al.

(10) Patent No.: US 10,551,215 B2
(45) Date of Patent: Feb. 4, 2020

(54) SYSTEMS, CIRCUITS AND METHODS FOR DETERMINING A POSITION OF A MOVABLE OBJECT

(71) Applicant: ANALOG DEVICES GLOBAL UNLIMITED COMPANY, Hamilton (BM)

(72) Inventors: Eoin E. English, Pallasgreen (IE); Javier Calpe Maravilla, Algemesi (ES); Robert Guyol, St. Louis, MO (US); Alan J. O'Donnell, Castletroy (IE); Maria Jose Martinez, Valencia (ES); Jan Kubik, Limerick (IE); Krystian Balicki, Limerick (IE)

(73) Assignee: ANALOG DEVICES GLOBAL UNLIMITED COMPANY, Hamilton (BM)

( * ) Notice: Subject to any disclaimer, the term of this patent is extended or adjusted under 35 U.S.C. 154(b) by 0 days.

(21) Appl. No.: 14/737,403

(22) Filed: Jun. 11, 2015

(65) Prior Publication Data

US 2016/0363462 A1 Dec. 15, 2016

(51) Int. Cl.
*G01D 5/20* (2006.01)

(52) U.S. Cl.
CPC ...................... *G01D 5/20* (2013.01)

(58) Field of Classification Search
CPC ...................................................... G01R 33/09
See application file for complete search history.

(56) References Cited

U.S. PATENT DOCUMENTS

| 3,852,661 A | * | 12/1974 | Szabo | ................... | G01D 5/204 |
| | | | | | 324/207.17 |
| 4,523,482 A | * | 6/1985 | Barkhoudarian | ....... | G01L 3/103 |
| | | | | | 324/209 |

(Continued)

FOREIGN PATENT DOCUMENTS

| CN | 1582385 A | 2/2005 |
| CN | 1912670 | 2/2007 |

(Continued)

OTHER PUBLICATIONS

"Microtechnologies for Biology and Healthcare", LETI, Annual Research Report 2014, 74 pages.

(Continued)

*Primary Examiner* — Noam Reisner
(74) *Attorney, Agent, or Firm* — Patent Capital Group

(57) ABSTRACT

An embodiment of a position sensing system includes a signal generation circuit to generate an excitation signal according to a selected characteristic signal, a drive circuit to drive an excitation source with the excitation signal, an input circuit to receive a sensor output while driving the excitation source, a signal detection circuit to identify a component of the sensor output corresponding to the characteristic signal, and a control circuit to determine the position of the movable object as a function of the identified component of the sensor output. The positioning system may be included an electronic camera, where the movable object may be a lens. The excitation source may be a conductive coil, the excitation a magnetic field, and the sensor a magneto resistive sensor. Alternatively, the excitation source may be an optical excitation source, the excitation an optical excitation, and the sensor an optical sensor.

30 Claims, 10 Drawing Sheets

(56) References Cited

U.S. PATENT DOCUMENTS

| | | | |
|---|---|---|---|
| 5,048,015 A * | 9/1991 | Zilberfarb | H04B 1/1027 370/312 |
| 5,432,639 A * | 7/1995 | Sakamoto | G02B 7/08 359/694 |
| 7,233,449 B2 | 6/2007 | Suemori et al. | |
| 7,574,126 B2 | 8/2009 | Honjo et al. | |
| 8,254,769 B2 | 8/2012 | Wu et al. | |
| 8,305,088 B2 | 11/2012 | Kiss et al. | |
| 8,327,527 B2 | 12/2012 | Christenson | |
| 8,380,057 B2 | 2/2013 | Wu et al. | |
| 8,488,282 B2 | 7/2013 | Sasaki et al. | |
| 8,497,917 B2 | 7/2013 | Ku | |
| 8,716,959 B2 | 5/2014 | David et al. | |
| 8,742,520 B2 | 6/2014 | Wan et al. | |
| 8,823,862 B2 | 9/2014 | Katsumata et al. | |
| 8,830,603 B2 | 9/2014 | Lee | |
| 8,878,528 B2 | 11/2014 | Quevy | |
| 8,947,082 B2 | 2/2015 | Kubik | |
| 8,957,680 B2 | 2/2015 | Mori | |
| 8,981,773 B2 | 3/2015 | Pozzati et al. | |
| 9,007,054 B2 * | 4/2015 | Friedrich | G01R 33/07 324/207.2 |
| 9,302,902 B2 | 4/2016 | Yaralioglu et al. | |
| 2006/0238925 A1 | 10/2006 | Wang et al. | |
| 2007/0139040 A1 | 6/2007 | Jones et al. | |
| 2007/0242152 A1 | 10/2007 | Chen | |
| 2007/0274556 A1 * | 11/2007 | Matsumura | H04R 1/22 381/412 |
| 2008/0134727 A1 | 6/2008 | May | |
| 2008/0245985 A1 * | 10/2008 | Heim | F16K 99/0001 251/129.06 |
| 2009/0102099 A1 * | 4/2009 | Feick | B29C 45/281 264/402 |
| 2009/0278534 A1 * | 11/2009 | Kahlman | B82Y 25/00 324/252 |
| 2009/0309582 A1 * | 12/2009 | Yu | G01B 7/003 324/207.21 |
| 2010/0045285 A1 | 2/2010 | Ohmori et al. | |
| 2011/0140814 A1 | 6/2011 | Christenson | |
| 2012/0161759 A1 | 6/2012 | Pozzati et al. | |
| 2012/0211336 A1 | 8/2012 | Christenson et al. | |
| 2012/0235647 A1 | 9/2012 | Chung et al. | |
| 2012/0306602 A1 | 12/2012 | Christenson | |
| 2013/0093436 A1 | 4/2013 | Thorn | |
| 2013/0301182 A1 | 11/2013 | Christenson et al. | |
| 2013/0328553 A1 * | 12/2013 | Quick | A61B 17/7016 324/207.22 |
| 2014/0009631 A1 | 1/2014 | Topliss | |
| 2014/0048395 A1 | 2/2014 | Christenson | |
| 2014/0062646 A1 | 3/2014 | Morrissey et al. | |
| 2014/0077906 A1 | 3/2014 | Christenson | |
| 2014/0111192 A1 | 4/2014 | Kubik | |
| 2014/0152406 A1 | 6/2014 | Christenson | |
| 2014/0208580 A1 | 7/2014 | Chung et al. | |
| 2014/0232390 A1 | 8/2014 | Fu et al. | |
| 2014/0320114 A1 | 10/2014 | Enkovaara | |
| 2014/0361348 A1 | 12/2014 | Yoneoka et al. | |
| 2014/0370638 A1 | 12/2014 | Lee et al. | |
| 2015/0002142 A1 | 1/2015 | Kubik | |
| 2015/0035089 A1 | 2/2015 | Liu et al. | |
| 2015/0091153 A1 | 4/2015 | Liu et al. | |
| 2015/0091636 A1 | 4/2015 | Chung et al. | |
| 2015/0108973 A1 | 4/2015 | Sugino | |
| 2015/0111332 A1 | 4/2015 | Lee | |
| 2015/0162152 A1 | 6/2015 | Christenson et al. | |
| 2016/0005530 A1 | 1/2016 | Kubik | |
| 2016/0009547 A1 | 1/2016 | Mason et al. | |
| 2016/0046483 A1 | 2/2016 | Cheng et al. | |
| 2016/0046484 A1 | 2/2016 | Cheng et al. | |
| 2016/0052777 A1 | 2/2016 | Lee et al. | |
| 2016/0054401 A1 | 2/2016 | Chang | |

FOREIGN PATENT DOCUMENTS

| | | |
|---|---|---|
| CN | 102939516 A | 2/2013 |
| JP | H08279326 A | 10/1996 |
| JP | 2000304765 A | 11/2000 |
| JP | 2006177684 A | 7/2006 |
| JP | 5078840 B2 | 11/2012 |
| JP | 2013027215 A | 2/2013 |
| KR | 101103772 B1 | 1/2012 |
| TW | I378310 B1 | 12/2012 |

OTHER PUBLICATIONS

Syms, "Scaling Laws for MEMS Mirror-Rotation Optical Cross Connect Switches", Journal of Lightwave Technology, vol. 20, No. 7, Jul. 2002, pp. 1084-1094.

Hah et al., "Theory and Experiments of Angular Vertical Comb-Drive Actuators for Scanning Micromirrors", IEEE Journal of Selected Topics in Quantum Electronics, vol. 10, No. 3, May/Jun. 2004, pp. 505-513.

"Op Amp Circuit Collection", National Semiconductor Application Note 31, Sep. 2002, National Semiconductor Corporation, 33 pages.

"Sensor Signal Conditioning IC for Closed-Loop Magnetic Current Sensor", Texas Instruments Incorporated, SBVS104B, Mar. 2009, 35 pages.

Quilici et al., "Embedded Magnetics Technology Overview", Radial Electronics, Feb. 2012, 8 pages.

Nickel, "Magnetoresistance Overview", Computer Peripherals Laboratory, HPL-95-60, Jun. 1995, Hewlett-Packard Company, 12 pages.

"Microfluidic Magnetic Particle Sorting and Separation : A Short Review", Last Visited Dec. 16, 2015, Elveflow, (http://www.elveflow.com/microfluidic-tutorials/microfluidic-reviews-and-tutorials/magnetic-particle-separation-a-short-review/), 11 pages.

Jeong et al., "Two-axis MEMS scanner with transfer-printed high-reflectivity, broadband monolithic silicon photonic crystal mirrors", Jun. 3, 2013, vol. 21, No. 11, Optical Society of America, 10 pages.

"MEMS-Based Magnetic Reed Switch Technology", Coto Technology, 2013, 24 pages. <http://www.mouser.com/pdfdocs/RedRock-White-Paper-130417.pdf>.

Murphy et al., "Lens Drivers Focus on Performance in High-Resolution Camera Modules", Analog Dialogue, Nov. 4-11, 2006, 3 pages.

* cited by examiner

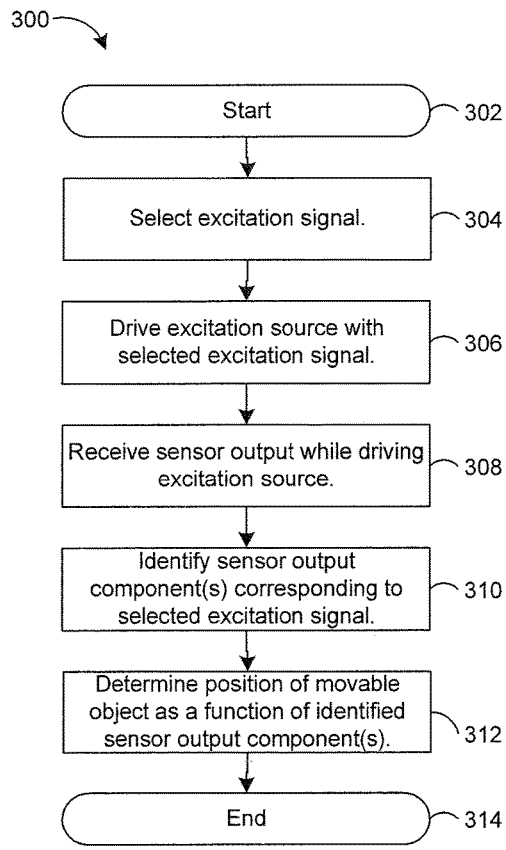
FIG. 3
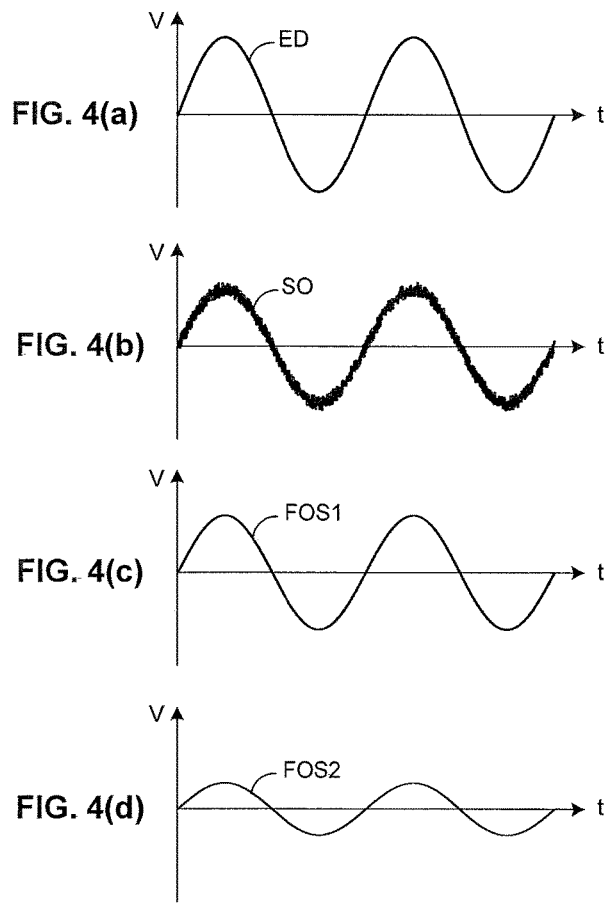
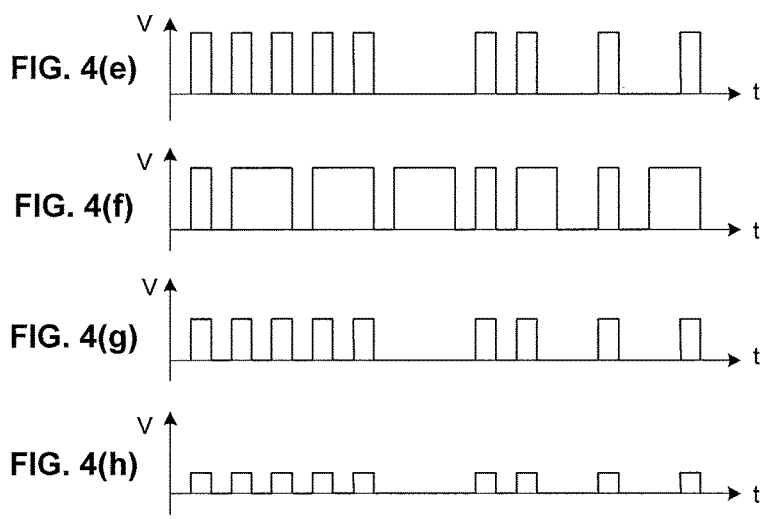

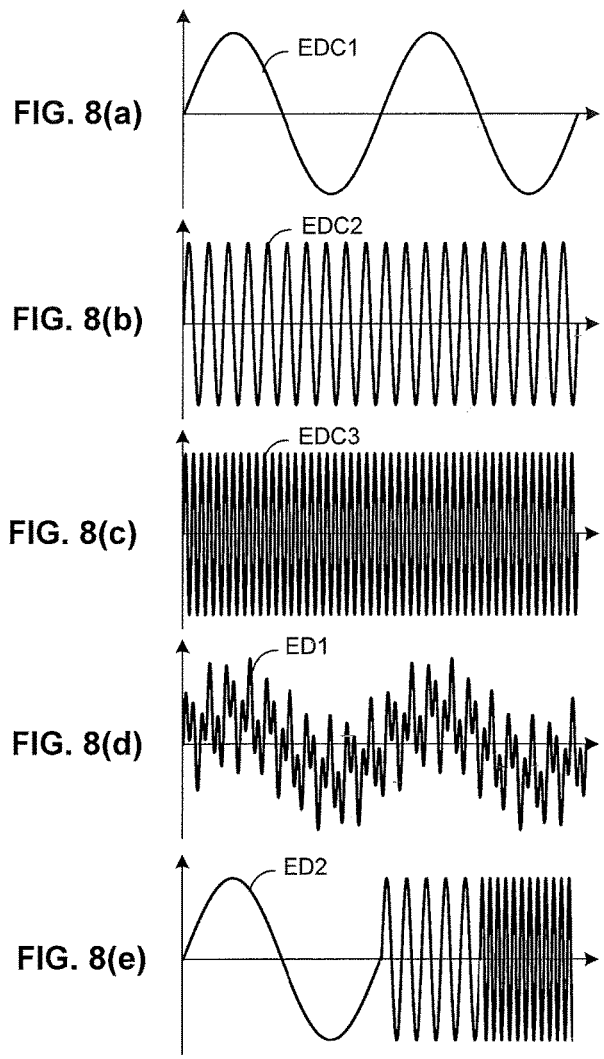
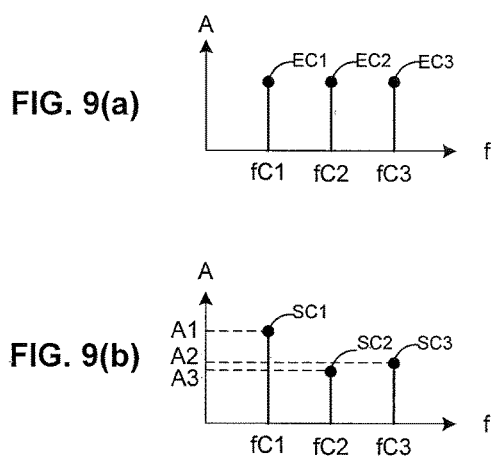
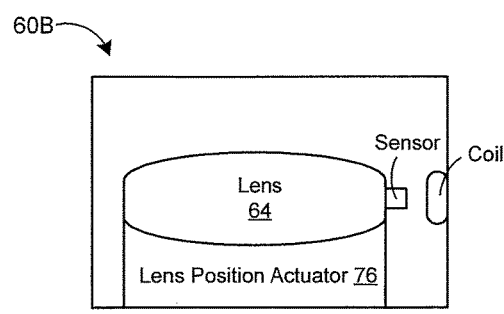
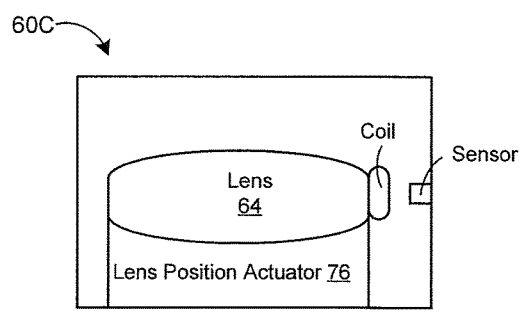
FIG. 10(a)　　　　　　　FIG. 10(b)

SYSTEMS, CIRCUITS AND METHODS FOR DETERMINING A POSITION OF A MOVABLE OBJECT

BACKGROUND INFORMATION

A variety of devices control movement of constituent components for different reasons. Electronic cameras, for example, typically include one or more lenses that are positioned along an optical axis for purposes of autofocus and zoom functions and along axes orthogonal to the optical axis for purposes of antishake and resolution enhancement functions.

Precise movement control typically necessitates a determination of the component's position. However, many devices entail noisy environments featuring interfering electric, magnetic and electromagnetic fields, among other noise sources, that degrade position sensing efforts. In electronic cameras, for example, actuators and other devices used for various purposes create intended and unintended fields that represent interference and/or noise for position sensing.

Therefore, a need exists for systems, circuits and methods to determine the position of a movable object in a noisy environment.

BRIEF DESCRIPTION OF THE DRAWINGS

So that features of the present invention may be understood, a number of drawings are described below. However, the appended drawings illustrate only particular embodiments of the invention and are therefore not to be considered limiting of its scope, for the invention may encompass other equally effective embodiments.

FIG. 3 is a flowchart depicting an embodiment of a method of operating the position sensing system to determine a position of a movable object.

FIGS. 4($a$)-4($h$) are signal diagrams depicting embodiments of signals of the position sensing system during a performance of the method of FIG. 3.

FIGS. 8($a$)-8($e$) are signal diagrams depicting embodiments of signals of the position sensing system during a performance of the method of FIG. 7.

FIG. 9($a$)-9($b$) depict embodiments of frequency domain representations of the excitation signal and sensor output of the position sensing system during an exemplary performance of the method of FIG. 7.

FIG. 10($a$)-10($b$) are sectional views depicting embodiments of an electronic camera including the position sensing system.

DETAILED DESCRIPTION OF EXAMPLE EMBODIMENTS

Figure 1:
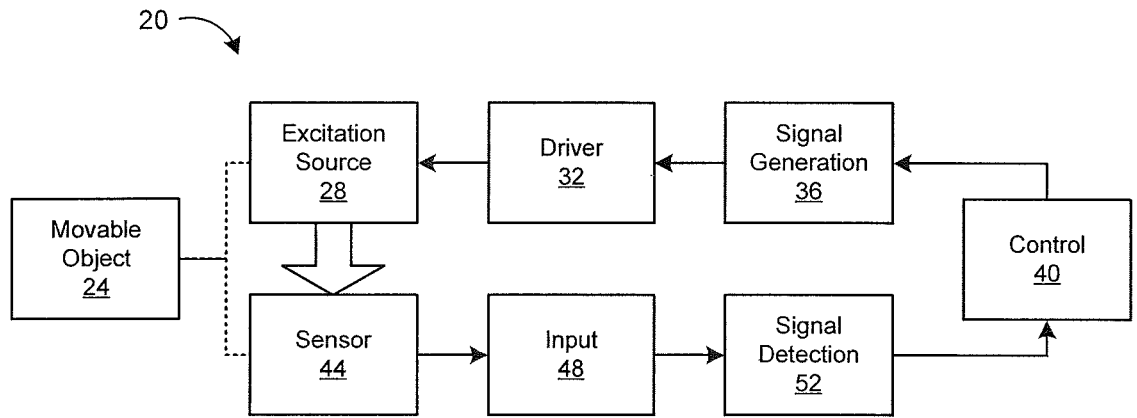
FIG. 1 is a circuit schematic depicting an embodiment of a position sensing system.

An embodiment of a position sensing system may include a signal generation circuit to generate an excitation signal having a "fingerprint" likely to survive corruption from interfering sources encoded therein. A drive circuit may drive an excitation source with the excitation signal, and a sensor may produce an output while the excitation source is driven. Ideally, the sensor's output would contain only components corresponding to the excitation signal but, more than likely, will also contain other signal components due to influence of ambient interfering sources. A detection circuit may detect the fingerprint within the sensor output, and a control circuit may determine a position of the movable object from an analysis of the detected fingerprint.

A variety of fingerprints may be included in the excitation signal. In one embodiment, the fingerprint may be represented by an analog signal, such as a sinusoidal, triangular or square wave, at a selected predetermined frequency. In other embodiments, the fingerprint may be represented by a combination of such signals at a plurality of different frequencies, for example, either a summation or a time-division multiplexing of these signals. In still other embodiments, the fingerprint may be represented by a digital signal, such as a pseudo-noise or a pulse density modulated signal. The type of fingerprint may be selected based on an analysis of an environment in which the system may be used and the types of interfering sources that likely would be encountered. The type of fingerprint also may be determined based on the circuitry used to drive the excitation signal and sense the excitation.

The system may sample the sensor output, such as captured either when the excitation source is driven with the excitation signal or is disabled, and analyze the sensor output to determine if ambient noise sources are more likely to cause interference with some fingerprints than others. The system may select a fingerprint for use as the excitation signal that is determined to reduce the likelihood of interference with ambient noise sources that are detected.

The position sensing system may be included in an electronic camera, where the movable object may be a lens. Alternatively, the position sensing system may be included in a wide variety of other devices, such as in one or more of a combustion engine, electric motor or hybrid power source, where the movable object may be a component of one of these devices, or in an audio system, where the movable object may be a diaphragm of an audio speaker.

The excitation source may be a conductive coil, the excitation a magnetic field, and the sensor a magneto resistive sensor. Alternatively, the excitation source may be an optical excitation source, the excitation an optical excitation, and the sensor an optical sensor.

In an embodiment, the system may select a plurality of different fingerprint components. The sensor output may be processed to identify output components corresponding to the selected fingerprint components. The identified sensor output components may be compared to each other to determine whether a subset of the output components correlate, such as by comparing a difference in amplitudes of the components to a predetermined threshold. If a correlating subset of the output components exists, the position of the movable object may be determined as a function of the correlating subset. If no correlating subset exists, a different plurality of excitation signal components may be selected.

The data gathered by the position sensing system also may be used to evaluate whether mechanical wear, misalignment or other problem or performance degradation associated with the operation of the movable object has occurred.

FIG. 1 depicts an embodiment of a position sensing system 20 to determine the position of a movable object 24. The movable object 24 may have a position, within a device containing the position sensing system 20, controlled by a positioning system (not shown) to implement functionality of the device. One of an excitation source 28 or a sensor 44 of the position sensing system 20 may be physically coupled to the movable object 24, while the other of the excitation source 28 or sensor 44 may be physically coupled to a housing or other structural component of the device that is stationary within the device relative to the movable object 24.

The position sensing system 20 may include an excitation module and a sensing module. The excitation module may include the excitation source 28, a driver circuit 32, a signal generation circuit 36 and portions of a control circuit 40. The excitation source 28 may generate an excitation in the vicinity of the sensor 44 as a function of an excitation signal received from the driver circuit 32. The generated excitation may include one or more of a magnetic, electromagnetic or electric field. The driver 32 may generate the excitation signal as a function of a driver input signal received from the signal generation circuit 36. The signal generation circuit 36 may generate the driver input signal as a function of a control signal received from the control circuit 40. The control circuit 40 may generate the control signal as a function of factors discussed herein, which may include, e.g., an analysis of a detection signal received from a signal detection circuit 52.

The sensing module may include the sensor 44, an input circuit 48, the signal detection circuit 52 and portions of the control circuit 40. The sensor 44 may generate a sensor output as a function of an excitation sensed by the sensor 44. The input circuit 48 may prepare the output received from the sensor 44 by one or more of filtering, amplifying, digitizing or serializing of the sensor output. The signal detection circuit 52 may generate a detection signal as a function of the prepared sensor output.

Figure 2:
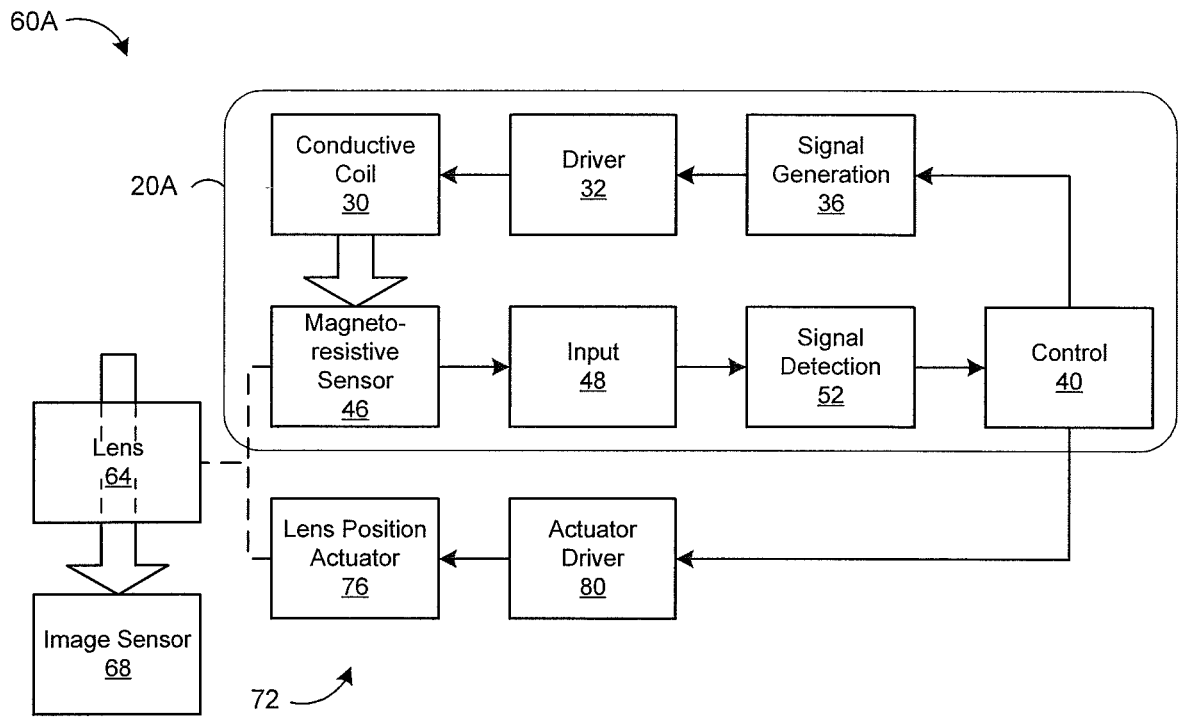
FIG. 2 is a circuit schematic depicting an embodiment of an electronic camera including the position sensing system.

The position sensing system 20 may be included in an electronic camera to sense the position of a lens. FIG. 2 depicts an embodiment of an electronic camera 60A. The camera 60A may include a lens 64, an image sensor 68, a lens positioning system 72, and an embodiment of the position sensing system 20A.

The lens 64 may focus a light beam onto the image sensor 64 for purposes of capturing an image. The camera 60 may optionally include a plurality of lenses 64. The image sensor 68 may capture an image as a function of the light beam directed onto it by the lens 64. The image sensor 68 may include an integrated circuit image sensor such as one or more of a charge-coupled device (CCD) image sensor, a complimentary metal-oxide-semiconductor (CMOS) image sensor, or an infrared image sensor.

The lens positioning system 72 may control movement of the lens 64 relative to a housing or other structure of the camera 60. The lens positioning system 72 may control the movement of the lens 64 along one or more of a direction parallel to an optical axis of the camera 60 to provide autofocus and zoom functions, or directions orthogonal to the optical axis to provide antishake and resolution enhancement functions.

The lens positioning system 72 may include a lens position actuator 72, an actuator driver 80, and a portion of the control circuit 40. The lens position actuator 76 may exert a force on the lens as a function of a lens drive signal received from the actuator driver 80 to position the lens 64. The lens position actuator 76 may be physically coupled to the lens 64 or a structure encasing the lens 64. The lens position actuator 76 may include one or more of a variety of different types of actuator devices, such as one or more of a stepper motor, a voice coil actuator, a piezoelectric actuator, or a shape-memory-alloy actuator, among others. The actuator driver 80 may generate the lens drive signal as a function of a lens position control signal received from the control circuit 40.

The lens positioning system 72 may optionally include a plurality of lens position actuators 76 and a corresponding plurality of actuator drivers 80. For example, the lens positioning system may include a different lens position actuator 76 and corresponding actuator driver 80 to perform each or a subset of autofocus, zoom, antishake and resolution enhancement functions.

The position sensing system 20A may provide magnetic excitation and sensing. In FIG. 2, the excitation module may include a conductive coil excitation source 30, the driver circuit 32, the signal generation circuit 36 and a portion of a control circuit 40. The conductive coil 30 may generate a magnetic field in the vicinity of a magnetic sensor 46 of the sensing module by conducting current in response to the excitation signal received from the coil driver circuit 32. The driver circuit 32, signal generation circuit 36, and control circuit 40 may operate as discussed above in regard to corresponding components in FIG. 1 and as further discussed below.

The sensing module may include a magneto resistive sensor 46, the input circuit 48, the signal detection circuit 52 and a portion of the control circuit 40. The magneto resistive sensor 46 may generate a sensor output signal as a function of a magnetic field it experiences. The magneto resistive sensor 46 may include magneto resistive elements formed from magnetic material having electrical resistance properties dependent upon the magnetic field experienced by the sensor 46. In one embodiment, the magneto resistive sensor 46 may be an anisotropic magneto resistive sensor. The magneto resistive sensor also may include one or more of a giant magneto resistive sensor or other types of magneto resistive sensors. The input circuit 48, signal detection circuit 52, and control circuit 40 may operate as discussed above in regard to corresponding components in FIG. 1 and as further discussed below.

FIG. 3 depicts an embodiment of a method 300 of operating the position sensing system 20 to determine the position of the movable object 24. The method 300 may begin at step 302.

The excitation signal delivered to the excitation source 28 may be selected to provide effective position sensing in a noisy environment at step 304. Selecting the excitation signal may include selecting one or more fingerprint components of the excitation signal.

Each of the selected excitation signal components may be of a variety of different signal types. A selected excitation signal component may include an analog signal, such as one or more of a sinusoidal, triangular, square or other periodic waveform. A selected excitation signal component also may be represented by a digital signal, such as one or more of a pseudo-random noise code or a pulse density modulated code. Each excitation signal component may have a corresponding signal frequency or frequency band. For example, a selected analog component may include a periodic waveforms having a frequency content at or centered at a corresponding frequency or frequency band. A selected digital component may include a digital code that, when embodied in the excitation signal, produces a frequency content at a corresponding frequency or frequency band. In addition or alternatively to selected frequency content, each excitation signal component may have corresponding phase content.

The excitation drive signal may be formed as a combination of one or more selected components. In one embodiment, the excitation signal may be formed as a simultaneous sum of the selected components. In another embodiment, the excitation signal may be formed as a time division multiplexing of the selected components.

In FIGS. 1 and 2, the control circuit 40 may select the one or more excitation signal components and provide a corresponding control signal indicating the selected components to the signal generation circuit 36. The signal generation circuit 36 may generate the drive input signal corresponding to the selected excitation signal components in response to the received control signal. The signal generation circuit 36 may include components to generate the driver input signal such as one or more of a voltage controlled oscillator, filter, or look-up table. The drive input signal may take different forms. When the excitation signal is formed from analog components, the signal generator 36 may generate an analog drive input signal having a form similar to the excitation signal to be generated. When the excitation signal is formed from digital components, the drive input signal may have either an analog or digital form representing the excitation signal to be generated.

Returning to FIG. 3, the excitation source 28 may be driven using the selected excitation signal at step 306. The drive circuit 32 may drive the excitation source 28 with the selected excitation signal as a function of the received drive input signal. Driving the excitation source 28 using the selected excitation signal may cause the excitation source to emit an excitation corresponding to the selected drive signal. For example, in FIG. 2, the conductive coil 30 may be driven at an input with the selected excitation signal to produce a magnetic field having properties as a function of the selected excitation signal, such as, e.g., a frequency content as a function of the selected frequency content of the excitation signal.

An output of the sensor 44 while the excitation source 28 is driven according to the selected excitation signal may be received at step 308. The sensor 44 may operate to sense an excitation experienced by the sensor 44 and generate an output proportional to or otherwise corresponding to the sensed excitation. The sensor output while the excitation source is driven by the selected excitation signal may represent both the excitation produced by the excitation source 28 and noise of the environment presented to the sensor 44 at that time. The sensor output may be received by the input circuit 48, which may optionally process the sensor output by performing one or more of amplifying, sampling, digitizing or filtering as discussed above. The processed sensor output may be received by the signal detection circuit 52.

The sensor output, or a signal corresponding to the sensor output, may be processed to identify one or more components of the sensor output corresponding to the selected excitation signal components at step 310. When the selected excitation signal includes one or more analog components at corresponding selected frequencies or frequency bands, the processing of the sensor output may include filtering the sensor output to determine sensor output components corresponding to each of the selected frequencies or frequency bands. When the selected excitation signal includes one or more components corresponding to selected digital codes, the processing of the sensor output may include detecting sensor output components corresponding to the selected digital codes, such as by correlating (e.g., multiplying) the received signal with the selected digital code. The signal detection circuit 52 may process the sensor output.

The position of the movable object may be determined according to the identified sensor output components at step 312. The position may be determined as a function of a property of the identified sensor output components. In one embodiment, the position is determined as a function of an amplitude of the sensor output components. As one of the excitation source 28 or sensor 44 is physically coupled to the movable object 24, and the other is physically coupled to a stationary housing or other component, the physical distance between the excitation source 28 and the sensor 44 will vary as the object 24 moves, and thus a strength of the excitation at the sensor 44, e.g., as measured by an amplitude of the sensor output, will vary as a function of the position of the movable object 24. In other embodiments, the position may be determined as a function of other properties of the sensor output components, such as, e.g., a phase or lag of the sensor output components.

In one embodiment, the selection of the excitation signal in step 304 selects a single excitation component and the position of the movable object 24 may be determined as a function of an amplitude of a single corresponding sensor output component. In another example, such as discussed below in regard to FIGS. 5 and 7, the selection of the excitation signal selects a plurality of excitation signal components and the position of the movable object 24 may be determined as a function of amplitudes of multiple sensor output components.

The method 300 may end at step 314.

FIGS. 4(a)-4(h) depict exemplary signals of the position sensing system 20 during a performance of an embodiment of the method 300 of FIG. 3. As discussed above, the selected excitation signal components may include analog signals. FIG. 4(a) depicts an exemplary excitation signal ED having a single sinusoidal excitation component at a single selected frequency. FIG. 4(b) depicts an exemplary sensor output SO received while the excitation source 28 is driven according to the excitation signal ED of FIG. 4(a). FIGS. 4(c) and 4(d) depict exemplary filtered sensor outputs FSO1, FSO2 at different times during the excitation, with the amplitude in FIG. 4(c) representing a first position of the movable object 24, and the different amplitude in FIG. 4(d) representing a second position of the movable object 24 different than the first position.

The selected excitation signal components also may be represented by digital signals. FIG. 4(e) depicts an exemplary excitation signal in the form of a sequence of substantially constant amplitude pulses representing a selected excitation signal component in the form of a pseudo-random digital code. FIG. 4(f) depicts an exemplary sensor output received while the excitation source 28 is driven according to the excitation signal of FIG. 4(e). FIGS. 4(g) and 4(h) depict exemplary detected sensor output components, e.g., after performing a correlation of the sensor output to the selected excitation signal component, at different times during the excitation, with the amplitude in FIG. 4(g) representing a first position of the movable object 24, and the different amplitude in FIG. 4(h) representing a second position of the movable object 24 different than the first position. In FIG. 4(e)-4(h), the pseudo-random digital code is a length 13 Barker code (i.e., 1, 1, 1, 1, 1, 0, 0, 1, 1, 0, 1, 0, 1), although other pseudo-random codes may be used, such as different length Barker codes, including one or more of a length 2 Barker code (i.e., 1, 0, or 1, 1), a length 3 Barker code (i.e., 1, 1 0), a length 4 Barker code (i.e., 1, 1, 0, 1 or 1, 1, 1, 0), a length 5 Barker code (i.e., 1, 1, 1, 0, 1), a length 7 Barker code (i.e., 1, 1, 1, 0, 0, 1, 0) or a length 11 Barker code (i.e., 1, 1, 1, 0, 0, 0, 1, 0, 0, 1, 0).

The selected excitation signal also may be an analog signal encoded in a digital signal such as a pulse density modulated signal. For example, the selected excitation signal component may include an analog signal having a relatively low corresponding frequency content encoded into a pulse density modulated signal having a relatively higher digital modulation frequency. The corresponding sensor output component may be detected by filtering the sensor output to isolate the relatively lower frequency excitation signal component. In one embodiment, such filtering may be performed by operation of the sensor.

Figure 5:
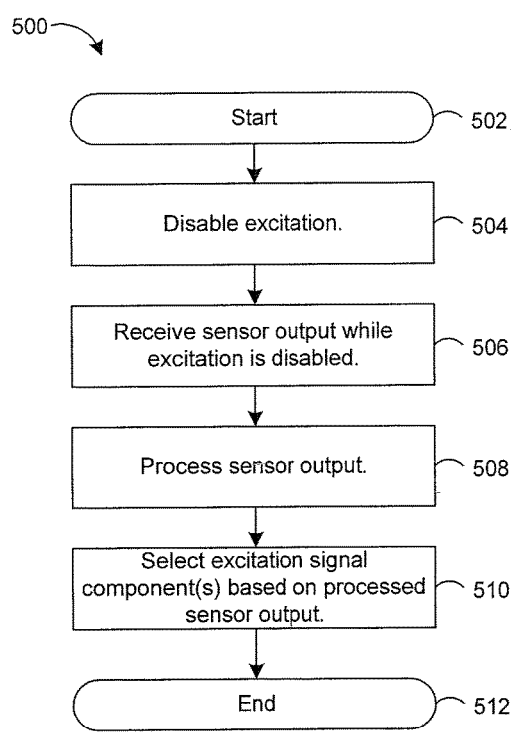
FIG. 5 is a flowchart depicting an embodiment of a method of selecting an excitation signal frequency for use by the position sensing system.

The selection of the excitation signal components in step 304 may be performed in different ways. FIG. 5 depicts an embodiment of a method 500 of selecting the excitation signal components to provide effective position sensing in a potentially noisy environment. The method 500 may begin at step 502.

The excitation generated by the excitation source 28 for position sensing purposes may be disabled at step 502. Disabling the excitation generated by the excitation source 28 may include one or more of disconnecting the excitation signal from the excitation source 28 or driving the excitation source 28 using an excitation signal having a form that does not generate a corresponding excitation. For example, in FIG. 2, the magnetic excitation may be disabled by disconnecting the driver output from the input of the conductive coil 30 or providing an excitation signal to the input of the coil 30 having a value that does not result in the coil 30 generating a magnetic field, such as, e.g., a zero or non-zero DC value.

An output from the sensor 44 while the excitation is disabled may be received at step 506. As discussed above, the sensor 44 may operate to generate a sensor output representing both an excitation produced by the excitation source 28 and noise of the environment presented to the sensor 44. While the excitation generated by the excitation source 28 is disabled, the sensor output may thus represent only the noise of the environment. As at step 308, the sensor output may be received by the input circuit 48, which may optionally prepare the sensor output. The prepared sensor output may be received by the signal detection circuit 52.

The sensor output while the excitation is disabled, or a signal corresponding to the sensor out, may be processed to determine properties of the sensor output at step 508. In one embodiment, the processing of the sensor output may include determining the frequency content of the of the sensor output, such as amplitudes of a frequency domain representation of the sensor output across a selected frequency range. For example, the processing may include determining amplitudes of a frequency domain representation of the sensor output at a plurality of frequencies across a selected frequency range between a first frequency and a second frequency. In another example, the processing may include determining an average amplitude of the frequency domain representation of the sensor output for each of a plurality of sequential frequency bands across the selected frequency range.

Figure 6A:
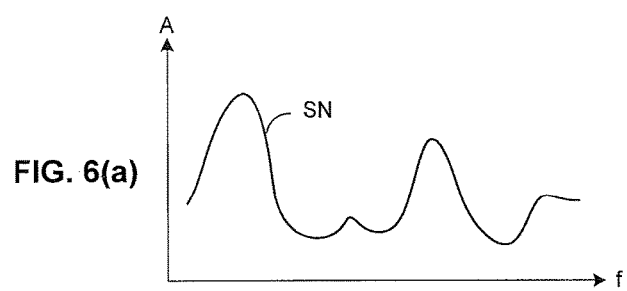
FIG. 6($a$)-6($c$) depict embodiments of frequency domain representations of a sensor output of the position sensing system during a performance of the method of FIG. 5.
Figure 6B:
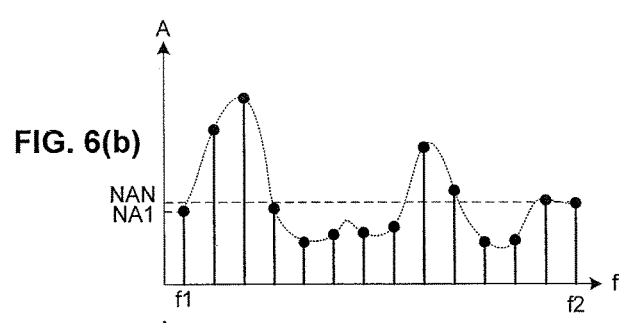
Figure 6C:
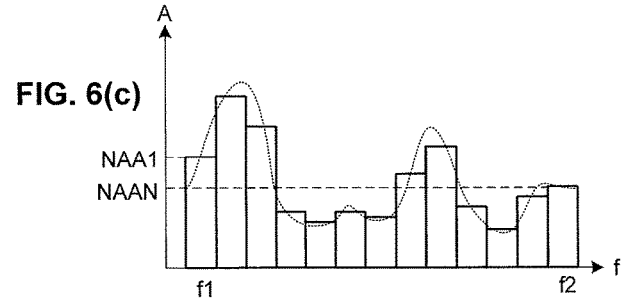

FIGS. 6(a)-6(c) depict exemplary frequency domain representations of the received sensor output during performance of an embodiment of the method 500 of FIG. 5. FIG. 6(a) shows an exemplary frequency domain representation SOF of the sensor output while the excitation is disabled. FIG. 6(b) shows exemplary amplitudes NA1 . . . NAN of the frequency domain representation of the sensor output of FIG. 6(a) at a plurality of frequencies spaced across a selected frequency range between first and second frequencies f1, f2. FIG. 6(b) shows exemplary average amplitudes NAA1 . . . NAAN of the frequency domain representation of FIG. 6(a) for a plurality of sequential frequency bands across the selected frequency range.

Returning to FIG. 5, one or more excitation signal components may be selected as a function of the processed sensor output at step 510. In one embodiment, one or more excitation signal component frequencies or frequency bands may be selected as a function of a determined frequency content of the sensor output. The one or more frequencies or frequency bands may be selected to provide effective position sensing in the presence of noise represented by the determined sensor output frequency content. Selecting the one or more frequencies or frequency bands may include selecting the one or more frequency bands as a function of determined amplitudes of the frequency domain representation of the sensor output. The one or more frequency bands may be selected on the basis of having the lowest corresponding amplitudes in a processed frequency range of the sensor output frequency domain representation. The one or more frequency bands also may be selected on the basis of having corresponding amplitudes below a predetermined threshold level in a processed frequency range of the sensor output frequency domain representation.

The method 500 may end at step 512.

In another embodiment, the selection of the excitation signal components may be performed while the excitation source is being driven with an excitation signal, such as by performing an embodiment of the method 500 of FIG. 5 in which the disabling of the excitation at step 504 is omitted.

Figure 7:
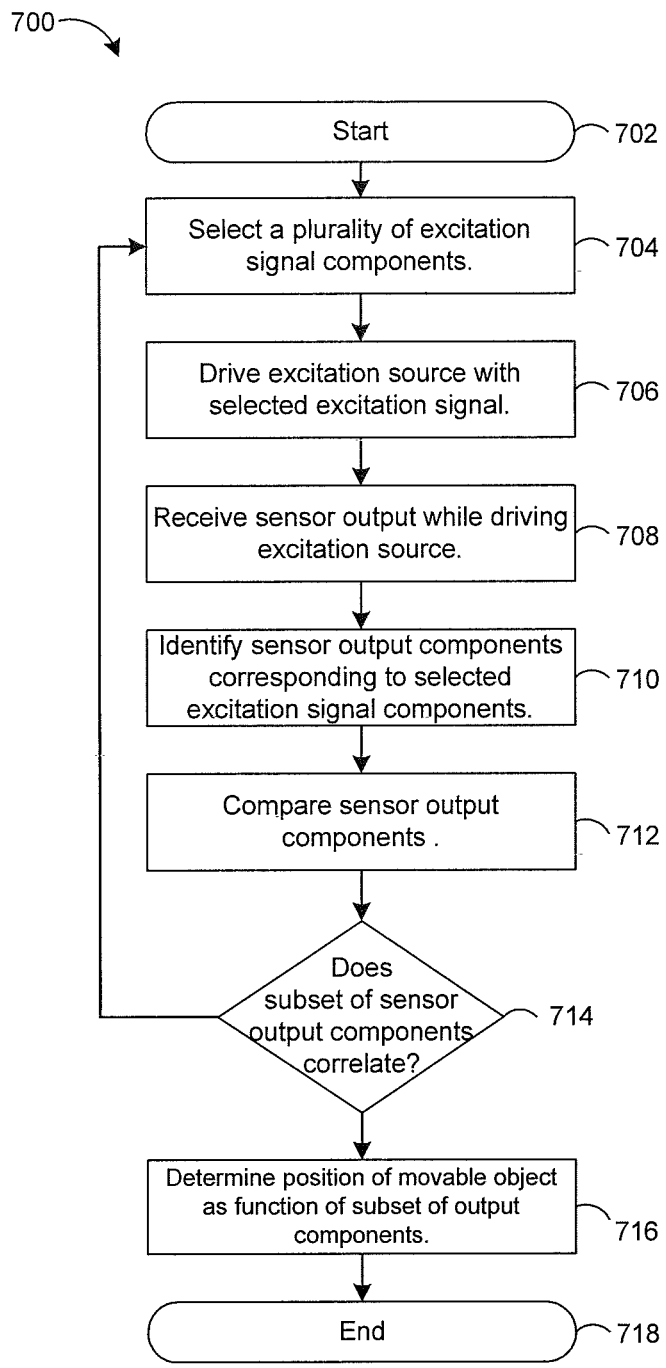
FIG. 7 is a flowchart depicting another embodiment of a method of operating the position sensing system to determine a position of a movable object.

The position sensing system 20 may utilize a plurality of excitation signal components to provide resistance to noise. FIG. 7 depicts another embodiment of a method 700 of operating the position sensing system 20 to determine the position of the movable object 24. The method 700 may begin at step 702.

A plurality of components of the excitation signal may be selected at step 704. Step 704 may be performed in a manner similar to step 304 of method 300. Selecting the plurality of components of the excitation signal may be performed according to embodiments of the method 500 depicted in FIG. 5. In one embodiment, each of selected plurality of components may correspond to a different respective one of a plurality of different frequencies or frequency bands. The excitation signal may be formed as a combination of the plurality of selected components, such as a simultaneous sum of the components or a time division multiplexing of the components.

FIGS. 8(*a*)-8(*e*) depict exemplary embodiments of selected excitation signal components and excitation signals formed from such components. FIG. 8(*a*)-8(*c*) depict exemplary first, second and third excitation signal components EDC1, EDC2, EDC3, respectively, each including a sinusoidal wave at a corresponding first, second or third frequency. FIG. 8(*d*) depicts an exemplary excitation signal ED1 formed as a simultaneous sum of the first, second and third excitation signal components EDC1, EDC2, EDC3 of FIGS. 8(*a*)-8(*c*). FIG. 8(*e*) depicts another exemplary excitation signal ED2 formed as a time division multiplex of the first, second and third excitation signal components EDC1, EDC2, EDC3 of FIGS. 8(*a*)-8(*c*).

Returning to FIG. 7, the excitation source 28 may be driven using the selected excitation signal at step 706. Step 706 may be performed in a manner similar to step 306 of method 300. Driving the excitation source 28 using the selected excitation signal may cause the excitation source 28 to emit an excitation with a plurality of components corresponding to the selected components of the excitation signal.

An output of the sensor 44 while the excitation source 28 is driven according to the selected excitation signal may be received at step 708. Step 708 may be performed in a manner similar to step 308 of method 300. The sensor output while the excitation source 28 is driven by the selected excitation signal may have a content representing both excitation components produced by the selected components of the excitation signal and noise of the environment. The sensor output may be received by the input circuit 48, which may optionally prepare the sensor output as discussed above, and then provided to the signal detection circuit 52.

The sensor output, or a signal corresponding to the sensor out, may be processed to identify sensor output components corresponding to the selected components of the excitation signal at step 710. Step 710 may be performed in a manner similar to step 310 of method 300. The processing of the sensor output may include determining sensor output components corresponding to the selected excitation signal components, such as filtering the sensor output to determine components at each of the frequencies or frequency bands of selected excitation signal components. The processing of the sensor output may be performed by the signal detection circuit 52.

FIGS. 9(*a*)-9(*b*) depict exemplary embodiments of frequency domain representations of selected excitation signal components and identified corresponding sensor output components, respectively. In FIG. 9(*a*), the excitation signal may be formed from three selected components EC1, EC2, EC3 at first, second and third frequencies FC1, FC2, FC3. In FIG. 9(*b*), corresponding filtered sensor output components FSC1, FSC2, FSC3 may exist at the first, second and third frequencies FC1, FC2, FC3.

The identified sensor output components corresponding to the selected components of the excitation signal may be compared to each other at step 712. Components of the excitation may be affected by noise in the environment as they travel from the excitation source 28 to the sensor 44. Sensor output components that are relatively more affected by the noise may have characteristics such as, e.g., amplitude, appreciably different than sensor output components relatively less affected by the noise. Sensor output components relatively less affected by the noise may therefore have properties such as amplitude that correlate well with each other, whereas sensor output components relatively more affected by the noise may correlate poorly to both components relatively less affected by the noise and other components relatively more affected by the noise. Comparing the identified sensor output components to each other may include comparing the amplitudes of the identified sensor output components to each other.

Returning to FIG. 9(*b*), the identified sensor output components FSC1, FSC2, FSC3 at the first, second and third frequencies FC1, FC2, FC3 may be compared to each other by comparing first second and third amplitudes A1, A2, A3 of these components to each other, such as by forming differences between the respective amplitudes and comparing the differences to a predetermined threshold. In the depicted exemplary embodiment, the first and second components FSC1, FSC2 may have an amplitude difference expressed by A1-A2, the first and third components FSC1, FSC3 may have an amplitude difference expressed by A1-A3, and the second and third components FSC2, FSC3 may have an amplitude difference expressed by A2-A3.

Returning to FIG. 7, a determination of whether a plural subset of the filtered sensor output components correlate with each other based on the comparison may be made at step 714. As discussed above, sensor output components relatively less affected by noise may correlate relatively well to each other, whereas sensor output components relatively more affected by noise may correlate relatively less well to other sensor output components. In one embodiment, a determination that a subset of the identified sensor output components correlate with each other may be made if the amplitudes of the subset are sufficiently close in value to each other, such as if the difference between the amplitudes is below a predetermined threshold level, which may be expressed as an absolute value or a percentage of the average of the components in question.

The comparing of the identified sensor output components of step 712 and the determining of whether a subset of the sensor output components correlate of step 714 may optionally be performed iteratively to increase a confidence in the accuracy of the compare and correlation.

In the example of FIG. 9(*b*), it may be determined that the differences between the first and second components A1-A2 and between the first and third components A1-A3 may be larger than a predetermined threshold, whereas the difference between the second and third components A2-A3 be below a predetermined threshold, and thus the second and third components FSC2, FSC3 may be identified as a correlating subset.

Returning again to FIG. 7, if a determination is made that an identified subset of the sensor output components correlate with each other at step 714, then the position of the movable object 24 may be determined according to the identified subset of sensor output components at step 716.

Step 716 may be performed in a manner similar to step 312 of method 300. In one embodiment, determining the position according to the identified subset of sensor output components may include determining the position as a function of one or more of the amplitudes of the subset of sensor output components, such as a function of a selected one of the amplitudes of the sensor output components or an average or other mathematical combination of more than one of the amplitudes of the sensor output components.

If a determination is made that no plural subset of the sensor output components correlate with each other at step 714, then the method may return to step 704, where a different plurality of excitation signal components, such as corresponding to a different plurality of signal frequencies or frequency bands, may be selected. In this way, the method of FIG. 7 may iteratively select excitation signal components so that a correlating subset of filtered output components may eventually be produced at step 714 and the position of the movable object 24 determined at step 716.

The method 700 may end at step 718.

As discussed above, one of the excitation source 28 or sensor 44 may be physically coupled to the movable object 24 and the other may be physically coupled to a structural or other component of a device containing the position sensing system 20. FIGS. 10(*a*)-10(*b*) depict embodiments of an electronic camera 60B, 60C containing the position sensing system 20A of FIG. 2. In FIG. 10(*a*), the sensor 46 may be physically coupled to the lens 64 and the conductive coil 30 may be physically coupled to a housing or other structural member of the camera 60B. In FIG. 10(*b*), the reverse may be realized, with the conductive coil 30 physically coupled to the lens 64 and the sensor 46 physically coupled to the housing or other structural member. In each case, the position sensing system 20A may operate as discussed above to determine the position of the lens 64, as in each case an amplitude of the magnetic excitation produced by the conductive coil 30 as sensed by the sensor 46 may vary as a function of the sensor position relative to the conductive coil 30, and thus represent the position of the movable lens 64 relative to the housing or structural member.

The data gathered by the position sensing system 20 also may be used to evaluate whether mechanical wear, misalignment or other problem associated with the operation of the movable object 24 or corresponding positioning system has occurred. For example, an evolution of the data gathered during the selection of the excitation signal components may be analyzed to determine whether mechanical wear, misalignment or other problem associated with the movable object 24 has occurred based on, e.g., whether one or more detected sensor output frequency domain levels change over time, which may indicate increasing noise or other undesirable phenomena at corresponding frequencies. In another example, an evolution of the data gathered during the correlation of the sensor output components may be analyzed to determine whether mechanical wear, misalignment or other problems associated with the movable object 24 has occurred based on, e.g., how closely a correlating subset of output components correlate to each other over time.

Figure 11:
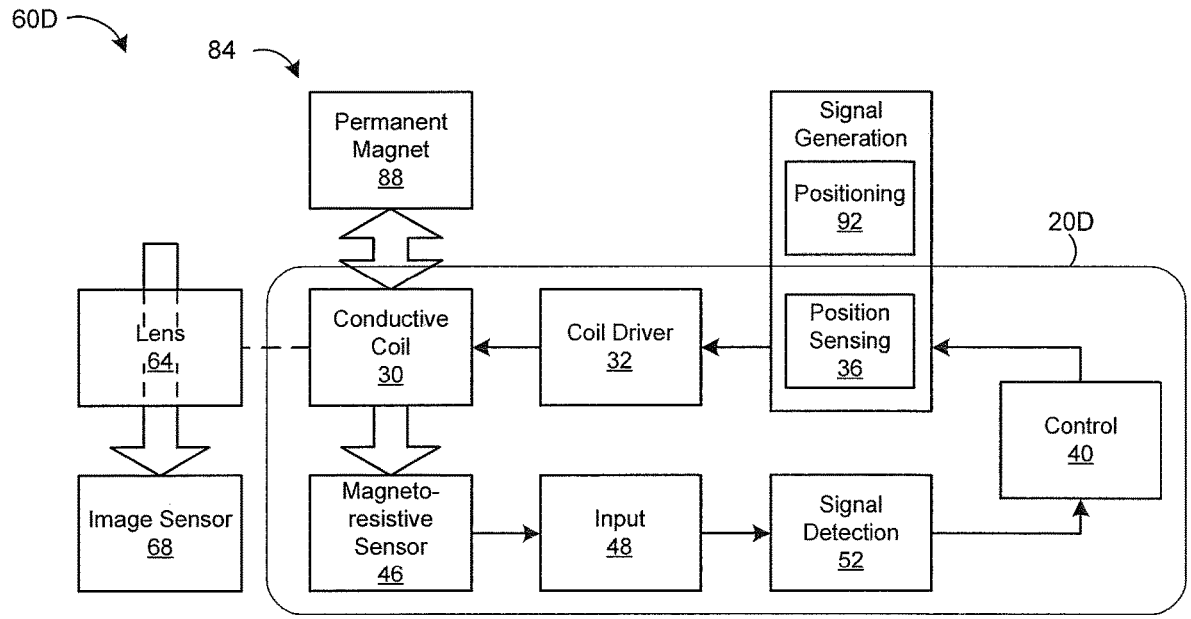
FIG. 11 is a circuit schematic depicting another embodiment of an electronic camera including the position sensing system.

The position sensing system 20 may be included in electronic cameras having other types of lens positioning systems. FIG. 11 depicts another embodiment of an electronic camera 60D. The camera 60D may include the lens 64, the image sensor 68, a lens positioning system 84, and an embodiment of the position sensing system 20D.

The lens positioning system 84 may be configured as a voice coil actuator. The lens positioning system may include a permanent magnet 88, the conductive coil 30, the coil driver 32, a positioning signal generator component 92, and a portion of the control circuit 40. One of the magnet 88 or the conductive coil 30 may be physically coupled to the lens 64 and the other may be physically coupled to a housing or other structural component of the camera 60D. In operation, for example when the coil 30 is coupled to the lens 64 and the magnet 88 is coupled to the housing, a current may be conducted through the coil 30 in the presence of the magnetic field produced by the magnet 88 to produce a force on the conductive coil 30 to position the coil 30 and lens 64.

The position sensing system 20D may include essentially the same components and operate in essentially the same manner as in FIG. 2, although these components and their operation may overlap those of the lens positing system 84. Both the lens positioning system 84 and the position sensing system 20D may utilize the same conductive coil 30 and coil driver 32 to perform their respective functions. The conductive coil 30 may conduct a current to generate a lens positioning force in response to a first component of a drive signal received from the coil driver 32, and generate a selected magnetic field as a function of a second component of the drive signal received from the coil driver circuit 32. The coil driver 32 may generate the drive signal provided to the field generating device as a function of a driver input signal having a first component generated by a positioning signal generator 92 and a second component generated by a position sensing signal generator 36. The positing signal generator 92 and position sensing generation 36 may generate the driver input signal provided to the drive circuit as a function of a control signal received from the control circuit 40. The control circuit 40 may generate the control signal provided to the signal generator components 36, 92 to perform lens positioning and position sensing.

Figure 12:
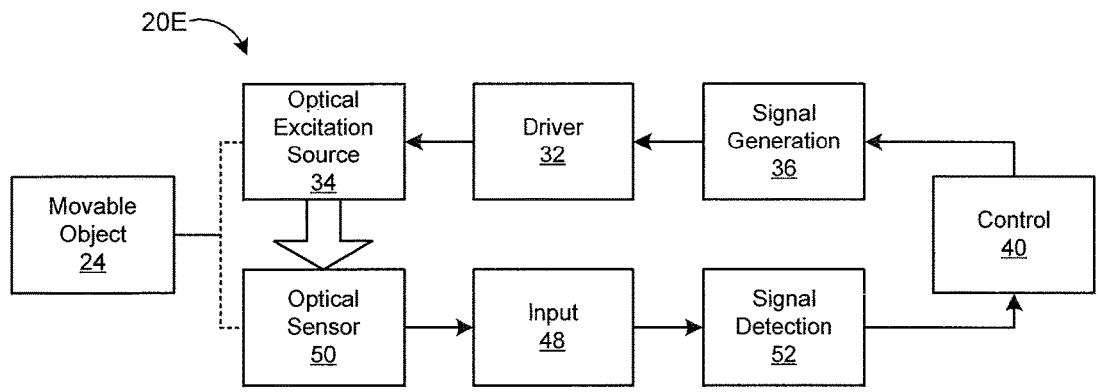
FIG. 12 is a circuit schematic depicting another embodiment of the position sensing system.

The position sensing system 20 alternatively may provide optical excitation and sensing. FIG. 12 depicts another embodiment of the positing sensing system 20E. An excitation module of the position sensing system may include an optical excitation source 34, the driver circuit 32, the signal generation circuit 36 and a portion of the control circuit 40. The optical excitation source 34 may generate an optical excitation in the vicinity of an optical sensor 50 of the sensing module as a function of a drive signal received from the driver circuit 32. The optical excitation source 34 may include a light source such as a light emitting diode. The optical excitation may include electromagnetic radiation in one or more of the visible, ultraviolet or infrared light wavelength bands. The driver circuit 32, signal generation circuit 36, and control circuit 40 may operate similar to as discussed above in regard to corresponding components of other embodiments of the positing sensing system 20.

The sensing module may include an optical sensor 50, the input circuit 48, the signal detection circuit 52 and a portion of the control circuit 40. The optical sensor 50 may generate a sensor output signal as a function of an optical excitation it experiences. The optical sensor 50 may include a light sensor such as a photodetector. The input circuit 48, signal detection circuit 52, and control circuit 40 may operate as discussed above in regard to corresponding components of other embodiments of the position sensing system 20.

The position sensing system 20E may operate to determine the position of the movable object 24 as discussed above, such as according to embodiments of the methods 300, 500 and 700 of FIGS. 3, 5 and 7, but in which the excitation and sensing may be an optical excitation and sensing.

Figure 13:
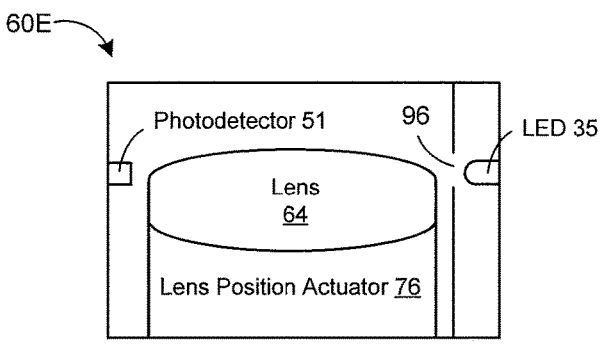
FIG. 13 is a sectional view depicting another embodiment of an electronic camera including the position sensing system.

As with other embodiments, one of the optical excitation source 34 or optical sensor 50 may be physically coupled to the movable object 24 and the other may be physically coupled to a structural or other component of a device containing the position sensing system. Alternatively, both the optical excitation source 34 and optical sensor 50 may be physically coupled to a housing or other structural component. FIG. 13 depicts an embodiment of an electronic camera 60E containing the position sensing system 20C of FIG. 12. In FIG. 13, an optical excitation source in the form of a light emitting diode 35 may be physically coupled to a first housing or other structural component of the camera 60E, and an optical sensor in the form of a photodetector 51 may be physically coupled to a second housing or other structural component of the camera 60E. The position sensing system 20C may operate as discussed above to determine the position of the lens 64, as the lens 64 may variably block the optical excitation, and produce an amplitude of the optical excitation as sensed by the photodetector 51, as a function of the lens position. An aperture 96 may be arranged between the light emitting diode 35 and photodetector 51 to tune the sensitivity of the position sensing system 20C.

Embodiments of the position sensing system 20 may utilize electromagnetic excitation and sensing in other wavelength bands.

Figure 14A:
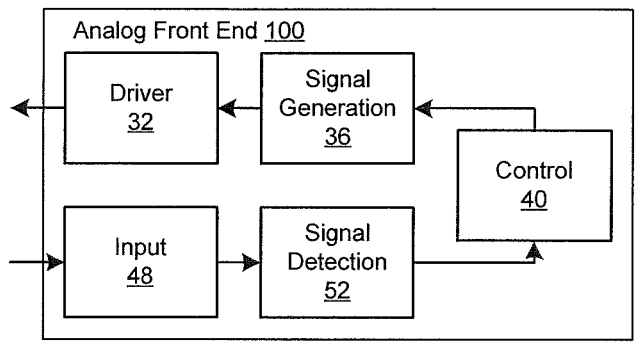
FIGS. 14($a$)-14($b$) are circuit schematics depicting embodiments of components of the position sensing system as divided between analog front end and digital engine integrated circuits.
Figure 14B:
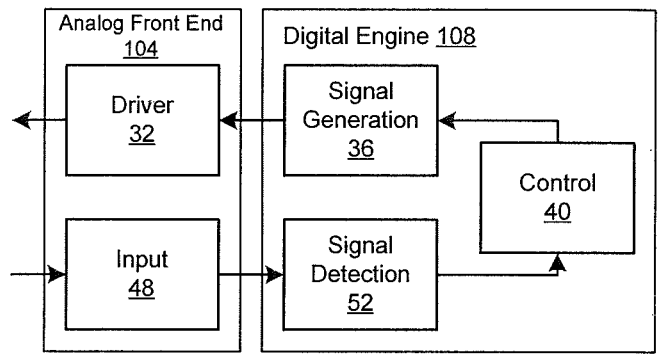

Components of the position sensing system 20 may be distributed between integrated circuits in different ways. Components of the position sensing system 20 may be distributed between analog and digital integrated circuits. FIG. 14(a) depicts an embodiment of a portion of the position sensing system 20 in which the driver circuit 32, signal generator circuit 36, input circuit 48, signal detection circuit 52 and control circuit 40 may be implemented as analog components in the form of an analog front end integrated circuit 100. FIG. 14(b) depicts an embodiment of a portion of the position sensing system 20 in which the driver circuit 32 and input circuit 48 may be implemented as analog components in an analog front end integrated circuit 104 and the signal generator circuit 36, signal detection circuit 52 and control circuit 40 may be implemented as digital components in a digital engine integrated circuit 108. In FIG. 14(b), the analog front end and digital engine integrated circuits 104, 108 may be formed on either separate or the same integrated circuit substrates.

Figure 15:
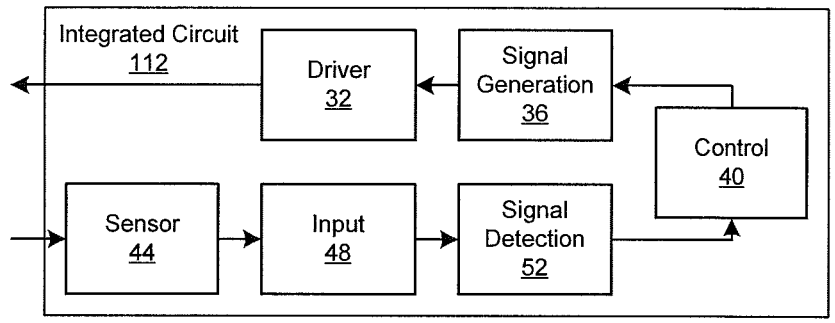
FIG. 15 is a circuit schematic depicting an embodiment of an integrated circuit including components of the position sensing system.

The sensor 44 of the position sensing system 20 may be integrated with other components of the position sensing system 20. FIG. 15 depicts an embodiment of a portion of the position sensing system 20 in which the sensor 44 is formed on the same integrated circuit substrate 112 as other components of the position sensing system 20 such as the driver circuit 32, signal generator circuit 36, input circuit 48, signal detection circuit 52 and control circuit 40.

Figure 16:
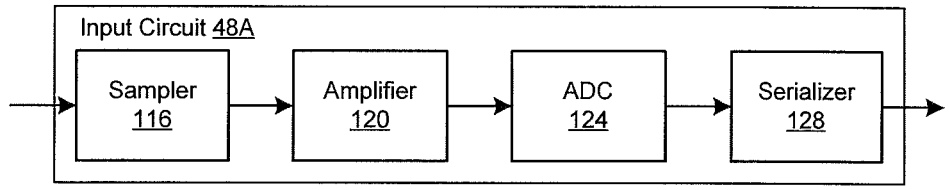
FIG. 16 is a circuit schematic depicting an embodiment of an input circuit of the position sensing system.

As discussed above, the input circuit 48 may optionally perform one or more of filtering, amplification, digitization or serialization of the sensor output. FIG. 16 depicts an embodiment of the input circuit 48A. The input circuit 48A may include one or more of a sampler 116, an amplifier 120, an analog-to-digital converter (ADC) 124 or a serializer 128.

Figure 17A:
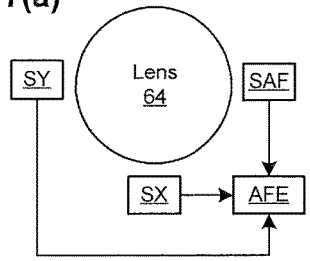
FIGS. 17($a$)-17($f$) are top and side views depicting embodiments of a lens and the position sensing system in an electronic camera.
Figure 17C:
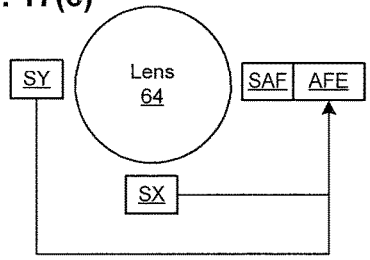
Figure 17E:
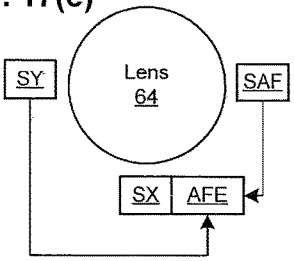
Figure 17B:
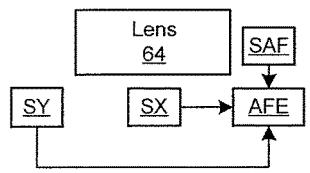
Figure 17D:
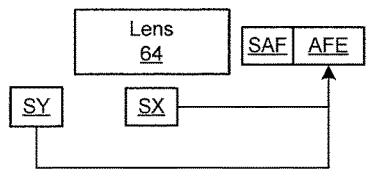
Figure 17F:
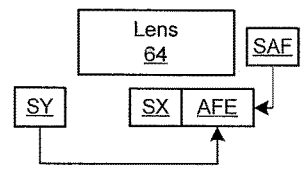

The position sensing system 20 may include a plurality of sensing modules to provide position sensing along a plurality of different axes. In an electronic camera, for example, the position sensing system 20 may include a plurality of sensors 44 to sense the position of the lens 64 along one or more of an optical axis and axes orthogonal to the optical axis. FIG. 17(a)-17(f) depict embodiments of the lens and position sensing system in an electronic camera. FIGS. 17(a)-17(b) show top and side views, respectively, of an embodiment in which a first sensor SAF is positioned to provide position sensing along the optical axis for autofocus, and second and third sensors SX, SY are positioned to provide position sensing along perpendicular X and Y axes orthogonal to the optical axis. In FIGS. 17(a)-17(b), the sensors may be provided as devices separate from an analog front end integrated circuit AFE containing other components of the position sensing system 20. FIGS. 17(c)-17(d) show top and side views, respectively, of an embodiment in which an the sensors SAF, SX, SY are again positioned to provide position sensing along the optical and orthogonal axes, but in which the autofocus sensor SAF may be integrated into or attached to the same integrated circuit substrate as the analog front end AFE. FIGS. 17(e)-17(f) show top and side views, respectively, of an embodiment in which another of the sensors, such as the X sensor SX, may be integrated into or attached to the same integrated circuit or integrated circuit package as the analog front end AFE.

Figure 18A:
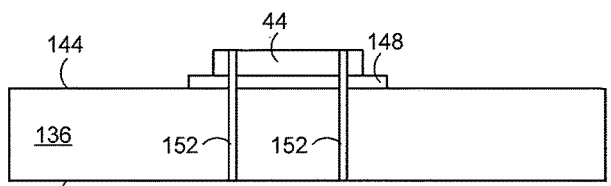
FIG. 18($a$)-18($c$) are sectional views of one or more sensors attached to a back side of an integrated circuit containing components of the position sensing system.

Aspects of the position sensing system 20 and its operation may be enhanced by attaching the sensor 44 to an integrated circuit substrate containing other components of the position sensing system 20. One or more sensors 44 of the position sensing system 20 may be attached to a back side of an integrated circuit substrate containing other components of the position sensing system 20. Attaching the sensor 44 in this manner may provide increased miniaturization of the position sensing system 20. FIG. 18(a) depicts an embodiment of an integrated circuit structure of the position sensing system 20. An integrated circuit substrate 136 may include a first side 140 having active areas including components of the position sensing system 20 such as one or more of the driver circuit 32, signal generation circuit 36, input circuit 48, signal detection circuit 52, and control circuit 40, for example implemented as an analog front end. The integrated circuit substrate 136 may also include a second side 144 facing an opposite direction from the first side 140, also referred to as a back side 144, onto which the sensor 44 of the position sensing system 20 may be attached. An insulating layer 148 may be included between the sensor 44 and the second side 144 of the integrated circuit substrate 136. The sensor 44 may include a second integrated circuit substrate having active areas, such as including magnetic material to form magneto resistive elements of a magneto resistive sensor. One or more through silicon vias (TSVs) 152 may travel through the integrated circuit substrate 136 and/or the sensor integrated circuit substrate to connect outputs or active areas of the sensor 44 to active areas of the integrated circuit substrate. Alternatively or in addition to TSVs, outputs or active areas of the sensor 44 may be connected to active areas of the integrated circuit substrate 136 by one or more conductive layers or traces extending from an output or active area of the sensor 44 to an active area of the integrated circuit substrate 136, such as by travelling around a side of the integrated circuit substrate or along another route. The sensor 44 may be connected to the integrated circuit substrate 136 so that the sensor active areas are facing in the direction opposite from the direction faced by the first side 140 of the integrated circuit substrate 136.

Figure 18B:
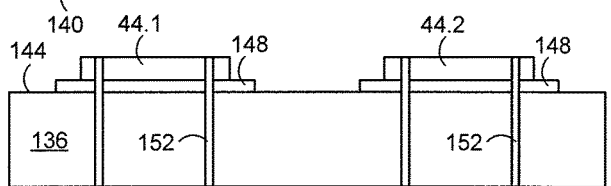

FIG. 18(b) depicts another embodiment of an integrated circuit structure of the position sensing system 20 in which a plurality of sensors 44 of the position sensing system 20 may be attached to the back side 144 of the integrated circuit substrate 136 containing other components of the position sensing system 20. A first sensor 44.1 may be attached to the second side 144 of the integrated circuit substrate 136 at a first location and a second sensor 44.2 may be attached at a second location. Attaching a plurality of sensors 44 in this manner may provide for aligning the sensors 44 so that each may provide sensing along a different predetermined direction, such as by aligning active areas of the sensor such as strips of magneto resistive material in a predetermined direction. For example, the sensors 44 may be aligned so that the first sensor 44.1 provides sensing along a first axis parallel to a plane of the back side 144 and the second sensor 44.2 provides sensing along a second axis parallel to the back side plane but orthogonal to the first axis.

Figure 18C:
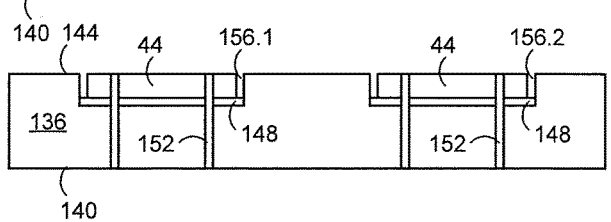

FIG. 18(c) depicts another embodiment of an integrated circuit structure the position sensing system 20 in which one or more sensors 44 of the position sensing system 20 may be attached in recesses 156 formed in the back side 144 of the integrated circuit substrate 136. A first sensor 40 may be attached in a first recess 156.1 formed in the second side 144 of the integrated circuit substrate 136 and one or more second sensors 44 may optionally be attached in a second recess 156.2 at a second location. Attaching sensors 44 in this manner may reduce a height profile of the integrated circuit substrate 136 and sensors 44.

Figure 19:
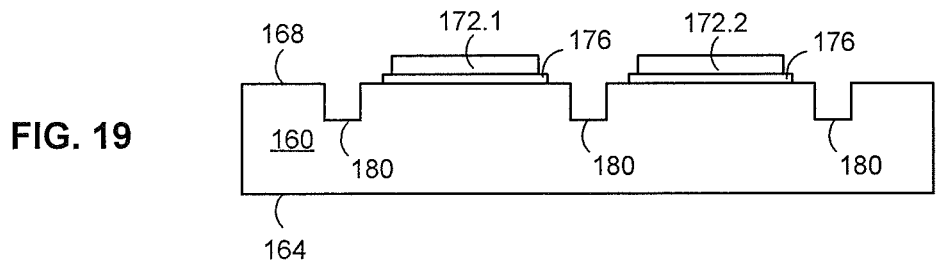
FIG. 19 is a sectional view of one or more layers of magnetic material deposited on a back side of an integrated circuit containing components of the position sensing system.

Magnetic material for forming sensor elements, such as magneto resistive elements of a magneto resistive sensor, may also be attached to or deposited on the back side of an integrated circuit substrate containing other components of the position sensing system 20. Depositing magnetic material in this manner may eliminate the need for a separate integrated circuit substrate for the sensor 44. FIG. 19 depicts another embodiment of an integrated circuit structure of the position sensing system 20. An integrated circuit substrate 160 may include a first side 164 having active areas including components of the position sensing system 20 and a second side 168 facing an opposite direction from the first side 164, i.e., a back side 168. A first layer of magnetic material 172.1 may be deposited on the second side 168 of the integrated circuit substrate 160 at a first location. One or more second layers of magnetic material 172.2 may optionally be deposited at one or more second locations. The first and second layers of magnetic material 172.1, 172.2 may have different properties, such as one or more of differently aligned polarities, different thicknesses, different shapes, different material concentrations, etc. An insulating layer 176 may optionally be included between the magnetic material 172 and the second side 168 of the integrated circuit substrate 160. The insulating layer 176 may optionally be an interposer, such as used to connect the integrated circuit substrate 160 to electrical connections. Recesses and/or trenches 160 may be formed between deposited layers of the magnetic material 172. The recesses 160 may serve to reduce mechanical stress imparted on the magnetic material, which may reduce an inherent electrical offset present in a sensor 44 formed from the magnetic material.

Figure 20A:
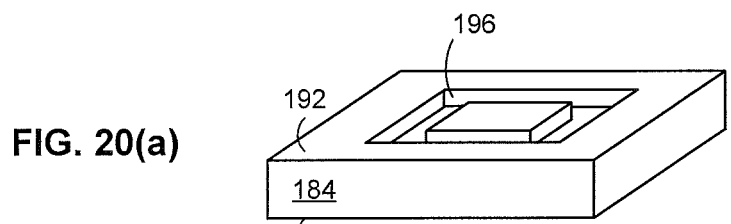
FIG. 20($a$)-20($c$) are perspective views of one or more recesses in a back side of an integrated circuit including components of the position sensing system into which magnetic material may be deposited.
Figure 20B:
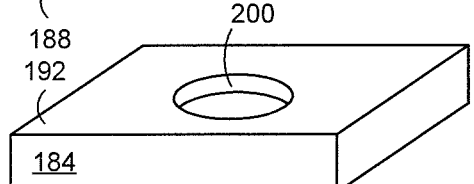
Figure 20C:
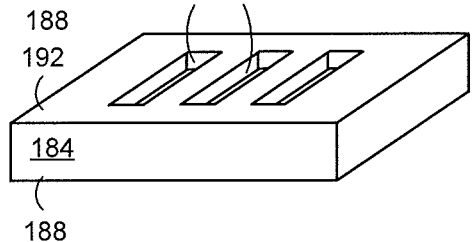

Magnetic material for forming sensor elements may also be inserted or deposited into recesses formed on the back side of an integrated circuit substrate containing other components of the position sensing system. Depositing magnetic material in this manner may provide for aligning sensors 44 formed from the magnetic material, such as by aligning active areas of the sensor 44 such as strips of magneto resistive material, for sensing along predetermined axes. FIG. 20(a) depicts an embodiment of an integrated circuit structure of the position sensing system 20. An integrated circuit substrate 184 may include a first side 188 having active areas including components of the position sensing system 20 and a second side 192 facing an opposite direction from the first side 188. The integrated circuit substrate 184 may include one or more recesses 196 formed in the second side 192 to accommodate magnetic material. The recesses 196 may have a shape configured to provide specific magnetic properties for the magnetic material, such as one or more of aligning of magnetic fields in the material, aligning of magnetic field sensitivity of the material, etc. In FIG. 20(a), the recess 196 may include a hollow square or rectangular shaped recess. FIG. 20(b) depicts another embodiment in which the second side 192 of the integrated circuit substrate 184 may include one or more circular or elliptical shaped recesses 200. FIG. 20(b) depicts another embodiment in which the second side 192 of the integrated circuit substrate 184 may include one or more rectangular or strip shaped recesses 204. Note that FIGS. 20(a)-20(c) omit the magnetic material for purposes of clarity in showing the shape of the recesses, but magnetic material may be deposited to partially or wholly fill the recesses. Magnetic material may be inserted or deposited into recesses by one or more of inserting a prefabricated slab of magnetic material into the recess, screen printing a paste with magnetic particles into the recess, plating the recess with magnetic material, sputtering magnetic material into the recess, etc.

Figure 21:
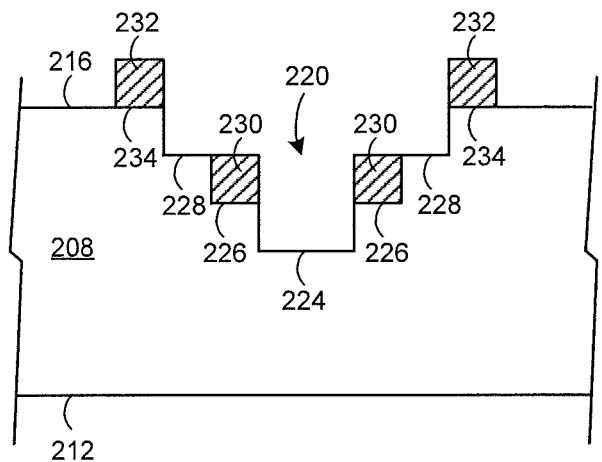
FIG. 21 is a partial sectional view of a recess in the back side of the integrated circuit including components of the position sensing system having a plurality of levels onto which magnetic material may be deposited.

Magnetic material for forming sensor elements may also be deposited at different heights about a recesses formed on the back side of an integrated circuit substrate containing other components of the position sensing system 20. Depositing magnetic material in this manner may provide for enabling specific sensor properties, such as sensitivity to magnetic fields changing along the height of the recess. FIG. 21 depicts an embodiment of an integrated circuit structure of the position sensing system 20. An integrated circuit substrate 208 may include a first side 212 having active areas including components of the position sensing system 20 and a second side 216 facing an opposite direction from the first side 212. The integrated circuit substrate 208 may include one or more recesses 220 formed in the second side 216 of the integrated circuit substrate 208 to accommodate magnetic material. The recesses 216 may have a shape configured to provide surfaces at a plurality of different heights. In FIG. 21, the surfaces may include a first, second, and third surfaces 224, 226, 228 at first, second, and third different heights relative to the second side 216 of the substrate 208. A plurality of layers of magnetic material may be deposited on a plurality of different surfaces at different heights. In FIG. 21, this may include a first magnetic layer 230 deposited on the second recess surface 226 and a second magnetic layer 232 deposited on a fourth surface 234 about the recess 220, although other configurations of layers and surfaces are possible.

Although embodiments of a digital camera 60 including the position sensing system 20 are discussed herein, a wide variety of other devices may include embodiments of the position sensing system 20.

In one example, one or more of a combustion engine, electric motor or hybrid power source, such as in an automotive vehicle, may include an embodiment of the position sensing system 20, and the movable object may be a component of such a device. The position sensing system 20 may determine the position of such a component in these devices.

Figure 22:
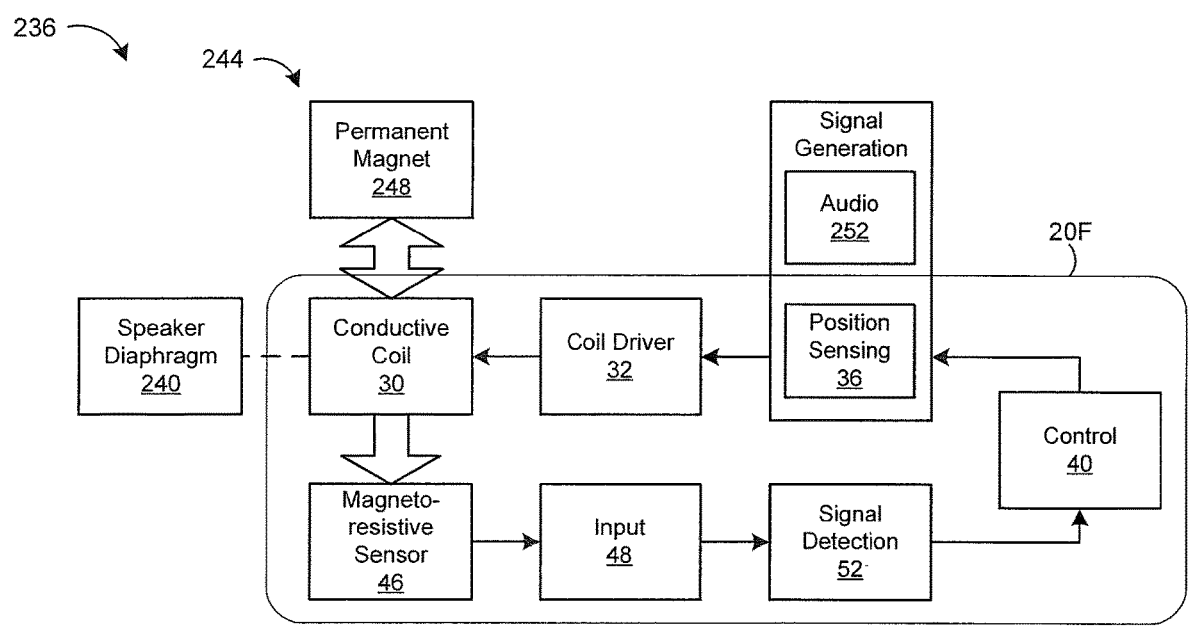
FIG. 22 is a circuit schematic depicting an embodiment of an audio system including the position sensing system.

In another example, an audio system may include an embodiment of the position sensing system 20F, and the movable object may be a diaphragm of an audio speaker of the audio system. FIG. 22 depicts an embodiment of such an audio system 236. The audio system 236 may include a speaker diaphragm 240, an audio driving system 244, and an embodiment of the position sensing system 20F. The audio driving system 244 may be configured as a voice coil actuator system, and may include a permanent magnet 248, the conductive coil 30, the coil driver 32, an audio signal generator component 252, and a portion of the control circuit 40. The depicted elements of the audio system 236 may function similarly to corresponding elements of the camera embodiment 60D depicted in and discussed above in regard to FIG. 11. In other embodiments, an audio system including the position sensing system 20 may include an actuator to drive the speaker diaphragm 240 for audio purposes other than a voice coil actuator, such as, e.g., a piezo actuator. In operation, the position sensing system 20F may select and utilize one or more excitation signal components having a frequency or frequencies outside an audio frequency band of the audio signal generated by the audio signal generator component 252 to determine the position of at least a portion of the diaphragm.

In embodiments of the audio system 236, the data gathered by the position sensing system 20F may be used to evaluate the performance of the speaker, such as whether mechanical wear, misalignment or other problem or performance degradation associated with the operation of the speaker diaphragm 240 or audio driving system 244 has occurred, similar to as discussed above. For example, an evolution of the data gathered during operation of the position sensing system 20F, such as during selection of the excitation signal components or during position sensing, may be analyzed to determine whether mechanical wear, misalignment or other problem or performance degradation associated with the speaker diaphragm 240 has occurred based on, e.g., whether one or more detected sensor output frequency domain levels, such as which may be associated with a resonance of the diaphragm, change over time. In another example, a change over time of a determined position of the speaker diaphragm 240 in response to a same specific audio signal may also indicate undesirable performance degradation.

In embodiments of the audio system 236, the audio signal generator component 252 may generate an audio signal as a function of data gathered by the position sensing system 20F, such as a function of the sensor output or identified sensor output components, to account for any mechanical wear, misalignment or other problem or performance degradation that may be identified based on such gathered data.

Additional embodiments of the position sensing system 20 and methods 300, 500, 700 of operating the position sensing system 20 are possible. For example, any feature of any of the embodiments of the position sensing system 20 or methods 300, 500, 700 of operating the position sensing system 20 described herein can optionally be used in any other embodiment of the position sensing system 20 or methods 300, 500, 700 of operating the position sensing system 20. Also, embodiments of the position sensing system 20 and methods 300, 500, 700 of operating the position sensing system 20 can optionally include any subset of the components or features of the position sensing system 20 and methods 300, 500, 700 of operating the position sensing system 20 described herein.

What is claimed is:

1. A method of determining a position of a movable object coupled to a voice coil actuator based upon a superposition of drive and excitation signals, the method comprising:
generating the superposition of signals from the drive signal and the excitation signal according to a selected characteristic signal, at least in part;
driving an excitation source with the superposition of signals using a conductive coil, at least in part;
positioning the movable object as a function of the drive signal;
receiving an output of a sensor while driving the excitation source;
identifying a component of the sensor's output corresponding to the characteristic signal associated with the excitation signal; and
determining a position of the movable object as a function of the identified component of the sensor output;
wherein, the excitation signal is outside an audio frequency band and the drive signal is inside the audio frequency band of the voice coil actuator.

2. The method of claim 1, further comprising selecting the characteristic signal from among a plurality of predetermined characteristic signals.

3. The method of claim 1, wherein the characteristic signal includes a signal with a plurality of superimposed frequencies.

4. The method of claim 1, wherein the characteristic signal includes a signal with a plurality of time-multiplexed frequencies.

5. The method of claim 1, wherein the characteristic signal includes a plurality of selected components, and the identifying processes the sensor output to produce a plurality of sensor output components corresponding to the selected excitation signal components.

6. The method of claim 5, further comprising:
comparing amplitudes of the identified sensor output components;
determining whether a subset of a plurality of the sensor output components have correlated amplitudes based on the comparing; and
upon a determination that a subset of the identified sensor output components has correlated amplitudes, determining the position of the movable object as a function of the amplitudes of the subset of the plurality of sensor output components.

7. The method of claim 6, further comprising, upon a determination that a subset of a plurality of the sensor output components do not have correlated amplitudes, selecting a different plurality of frequencies of the excitation signal.

8. The method of claim 2, wherein the selecting includes:
receiving a second output of the sensor prior to the driving of the excitation source;
identifying from the sensor's second output at least one of the predetermined characteristic signals that are subject to interference; and
in response to the identifying, selecting another of the characteristic signals as the excitation signal.

9. The method of claim 1, wherein the excitation source is a conductive coil, the excitation is a magnetic field, and the sensor is a magneto resistive sensor.

10. The method of claim 1, wherein the conductive coil is a solenoid.

11. The method of claim 1, wherein the movable object is a lens in an electronic camera.

12. The method of claim 1, wherein the movable object is a component of one or more of: a combustion engine, an electric motor, or a hybrid power source.

13. The method of claim 1, wherein the movable object is a diaphragm of an audio speaker.

14. The method of claim 1, further comprising evaluating a mechanical wear or misalignment of the movable object or corresponding positioning system based on the sensor output.

15. A position sensing system to determine a position of a movable object coupled to a voice coil actuator based upon a superposition of drive and excitation signals, comprising:

a signal generation circuit to generate the superposition of signals from the drive signal and the excitation signal according to a predetermined characteristic signal, at least in part;

a drive circuit to drive an excitation source with the superposition of signals;

an electromagnetic coil to drive the superposition of signals;

an input circuit to receive an output of a sensor while driving the excitation source;

a signal detection circuit to identifying a component of the sensor output corresponding to the characteristic signal associated with excitation signal; and a control circuit to determine the position of the movable object from an analysis of the identified component of the sensor output;

wherein, the excitation signal is outside an audio frequency band and the drive signal is inside the audio frequency band of the voice coil actuator.

16. The position sensing system of claim 15, wherein the characteristic signal includes a signal with a plurality of superimposed frequencies.

17. The position sensing system of claim 15, wherein the characteristic signal includes a signal with a plurality of time-multiplexed frequencies.

18. The position sensing system of claim 15, wherein the characteristic signal includes a plurality of selected components, and the signal detection circuit processes the sensor output to identify a plurality of sensor output components corresponding to the selected excitation signal components.

19. The position sensing system of claim 18, wherein the control circuit:

compares amplitudes of the identified sensor output components;

determines whether a subset of the sensor output components have correlated amplitudes based on the comparing; and upon determining that a subset of the identified sensor output components have correlated amplitudes, determines the position of the movable object as a function of the amplitudes of the subset of sensor output components.

20. The position sensing system of claim 19, wherein the control circuit, upon determining that a subset of the sensor output components do not have correlated amplitudes, selects a different plurality of frequencies of the excitation signal.

21. The position sensing system of claim 15, wherein:
the input circuit receives a second output of the sensor prior to the driving of the excitation source;
the signal detection circuit identifies from the sensor's second output at least one of a plurality of the predetermined characteristic signals that are subject to interference; and
in response to the identifying, the control circuit selects another of the characteristic signals as the excitation signal.

22. The position sensing system of claim 15, further comprising the excitation source to generate an excitation in response to being driving with the excitation signal.

23. The position sensing system of claim 15, further comprising the sensor to provide the output representing a sensed excitation while the excitation source is driven with the excitation signal.

24. The position sensing system of claim 15, wherein the excitation source is a conductive coil, the excitation is a magnetic field, and the sensor is a magneto resistive sensor.

25. The position sensing system of claim 15, wherein the excitation source is a solenoid.

26. The position sensing system of claim 15, wherein the movable object is a lens in an electronic camera.

27. The position sensing system of claim 15, wherein the movable object is a component of one or more of: a combustion engine, an electric motor, or a hybrid power source.

28. The position sensing system of claim 15, wherein the movable object is a diaphragm of an audio speaker.

29. The position sensing system of claim 15, further comprising evaluating a mechanical wear or misalignment of the movable object or corresponding positioning system based on the sensor output.

30. A position sensing system to determine a position of a movable object coupled to a voice coil actuator based upon a superposition of drive and excitation signals, comprising:

means for generating the superposition of signals from the drive signal and the excitation signal according to a selected characteristic signal, at least in part;

means for driving an excitation source with the superposition of signals using a conductive coil, at least in part;

means for positioning the movable object as a function of the drive signal;

means for receiving an output of a sensor while driving the excitation source;

means for identifying a component of the sensor output corresponding to the characteristic signal associated with the excitation signal; and means for determining a position of the movable object as a function of the identified component of the sensor output;

wherein, the excitation signal is outside an audio frequency band and the drive signal is inside the audio frequency band of the voice coil actuator.

* * * * *